(12) United States Patent
Chang

(10) Patent No.: US 9,032,540 B2
(45) Date of Patent: May 12, 2015

(54) ACCESS SYSTEM AND METHOD THEREOF

(71) Applicant: Silicon Motion, Inc., Jhubei, Hsinchu County (TW)

(72) Inventor: Yu-Ping Chang, Hsinchu (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 117 days.

(21) Appl. No.: 13/913,677

(22) Filed: Jun. 10, 2013

(65) Prior Publication Data

US 2014/0137266 A1    May 15, 2014

(30) Foreign Application Priority Data

Nov. 12, 2012  (TW) .............................. 101141981 A

(51) Int. Cl.
*G06F 11/00*    (2006.01)
*G06F 21/10*    (2013.01)

(52) U.S. Cl.
CPC ........ *G06F 21/10* (2013.01); *G06F 2221/2135* (2013.01)

(58) Field of Classification Search
CPC .... G11B 20/00086; G06F 21/31; G06F 21/10
USPC ...................................................... 726/26–30
See application file for complete search history.

(56) References Cited

U.S. PATENT DOCUMENTS

| 5,805,699 A * | 9/1998 | Akiyama et al. ................. 705/58 |
| 7,516,316 B2 | 4/2009 | Chang et al. |
| 2013/0229446 A1 * | 9/2013 | Ito .................................. 345/690 |

FOREIGN PATENT DOCUMENTS

| TW | 371741 | 10/1999 |
| TW | 201009724 | 3/2010 |
| WO | WO 2008/046733 | 4/2008 |

OTHER PUBLICATIONS

English language translation of TW 371741 (published Oct. 11, 1999).
English language translation of TW 201009724 (published Mar. 1, 2010).

* cited by examiner

*Primary Examiner* — Anthony Brown
(74) *Attorney, Agent, or Firm* — McClure, Qualey & Rodack, LLP

(57) ABSTRACT

An access system including a storage medium and a host is disclosed. The storage medium includes an identification code. The host includes a processor, at least one connection port and an identification port. The processor executes a mass-production application program. The connection port is coupled to at least one electronic product. The identification port is coupled to the storage medium. When the mass-production application program is executed, the processor determines whether the identification code matches a key code. When the identification code matches the key code, the processor writes mass-production data to the electronic product.

9 Claims, 4 Drawing Sheets

ACCESS SYSTEM AND METHOD THEREOF

CROSS REFERENCE TO RELATED APPLICATIONS

This Application claims priority of Taiwan Patent Application No. 101141981, filed on Nov. 12, 2012, the entirety of which is incorporated by reference herein.

BACKGROUND OF THE INVENTION

1. Field of the Invention

The invention relates to an access system, and more particularly to an access system determining whether to execute a mass-production application program according to a specific storage medium.

2. Description of the Related Art

During the manufacturing of an electronic product, some initial setting values are written into the electronic product. However, the write operation is executed by a factory. Designers cannot monitor each write operation taking place in the factory. Thus, the number of executions of the write operation cannot be effectively controlled. Additionally, the number of successful and unsuccessful executions of the write operation also cannot be obtained. Furthermore, some specific products cannot occur in market. Thus, the number of successful executions of the write operation and the number of unsuccessful executions of the write operation must be strictly controlled and managed, otherwise commercial secrets may be leaked.

BRIEF SUMMARY OF THE INVENTION

In accordance with an embodiment, an access system comprises a storage medium and a host. The storage medium comprises an identification code. The host comprises a processor, at least one connection port and an identification port. The processor executes a mass-production application program. The connection port is coupled to at least one electronic product. The identification port is coupled to the storage medium. When the mass-production application program is executed, the processor determines whether the identification code matches a key code. When the identification code matches the key code, the processor writes mass-production data to the electronic product.

An access method for a host is provided. The host comprises at least one connection port and an identification port. The connection port is configured to couple to at least one electronic product. The identification port is configured to couple to a storage medium. An exemplary embodiment of a method for a portable device is described in the following. A mass-production application program is executed. It is determined whether an identification code of the storage medium matches a key code. Mass-production data is written to the electronic product when the identification code matches the key code.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
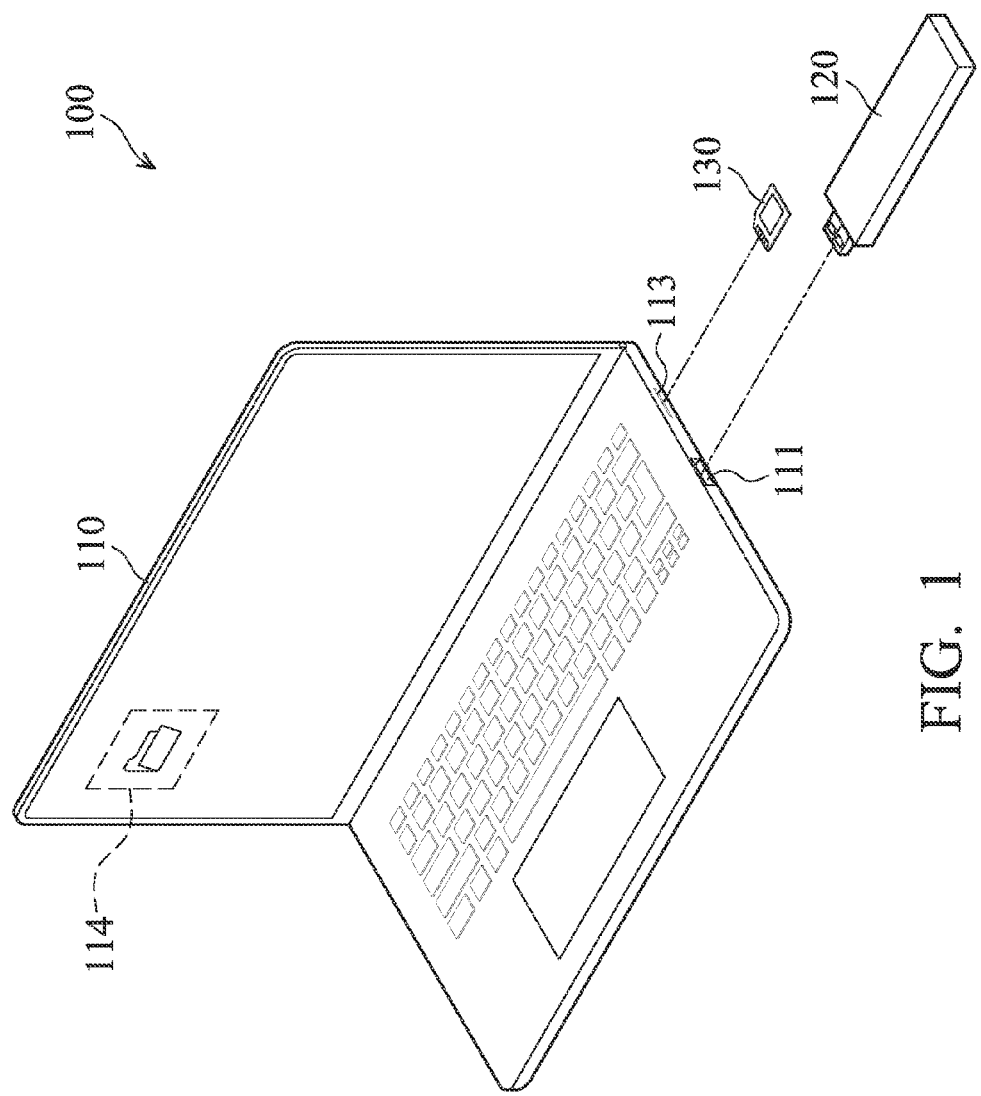
FIG. 1 is a schematic diagram of an exemplary embodiment of an access system.

FIG. 1 is a schematic diagram of an exemplary embodiment of an access system. The access system 100 comprises a host 110, a storage medium 120 and an electronic product 130. The invention is not limited to the kinds of the host 110, the storage medium 120 and the electronic product 130. Any device can serve as the host 110, as long as the device has a processing function and a determining function. In addition, any device can serve as the storage medium 120, as long as the device has a storage function. Furthermore, any electronic product can serve as the electronic product 130, as long as the electronic product needs initial setting values to be written.

In this embodiment, the host 110 is a notebook computer, the storage medium 120 is a flash disk, and the electronic product 130 is a secure digital (SD) card with NAND flash memory, but the disclosure is not limited thereto.

The host 110 comprises a processor (not shown), an identification port 111 and at least one connection port 113. The invention is not limited to the kinds of the identification port 111 and the connection port 113. In one embodiment, the identification port 111 and the connection port 113 are both USB ports. For example, the host 110 comprises various USB ports, wherein one USB port serves as the identification port 111 to couple to the storage medium 120 and the other USB port serves as the connection port 113 to couple to the electronic product 130. In other embodiments, the kind of the identification port 111 may differ from the kind of the connection port 113. Additionally, in another embodiment, the host 110 comprises a plurality of connection ports to directly couple to various electronic products or couple to various electronic products via a hub.

The processor of the host 110 is configured to execute a mass-production application program. In one embodiment, when a user selects an icon 114 displayed on a monitor, the processor executes the mass-production application program corresponding to the icon 114. The invention does not limit the internal circuit of the host 110. In one embodiment, the host 110 comprises various hardware elements that are used to execute the mass-production application program.

When executing the mass-production application program, the processor of the host 110 determines whether the identification port 111 is coupled to the storage medium 120. When the identification port 111 is not coupled to any storage medium or a specific storage medium, the processor stops executing the mass-production application program. Thus, the host 110 cannot write mass-production data to the electronic product 130.

In this embodiment, the processor determines whether the storage medium 120 is a specific storage medium according to the identification code of the storage medium 120 coupled to the identification port 111. For example, when the identification port 111 is coupled to the storage medium 120, the processor retrieves the identification code from the storage medium 120 and determines whether the identification code matches a specific key code.

When the identification code of the storage medium 120 matches the specific key code, it means that the storage medium 120 is the specific storage medium. Thus, the processor writes the mass-production data to the electronic product 130. However, when the identification code does not match the key code, it means that the storage medium 120 is not the specific storage medium. Thus, the processor stops executing the mass-production application program and stops writing the mass-production data to the electronic product 130.

In this embodiment, only one electronic product 130 is shown, but the disclosure is not limited thereto. In other embodiments, when the identification code of the storage medium 120 matches the key code, the processor of the host 110 writes the mass-production data to many electronic products of the same type. In one embodiment, the host 110 writes the mass-production data to many electronic products via a hub.

Figure 2:
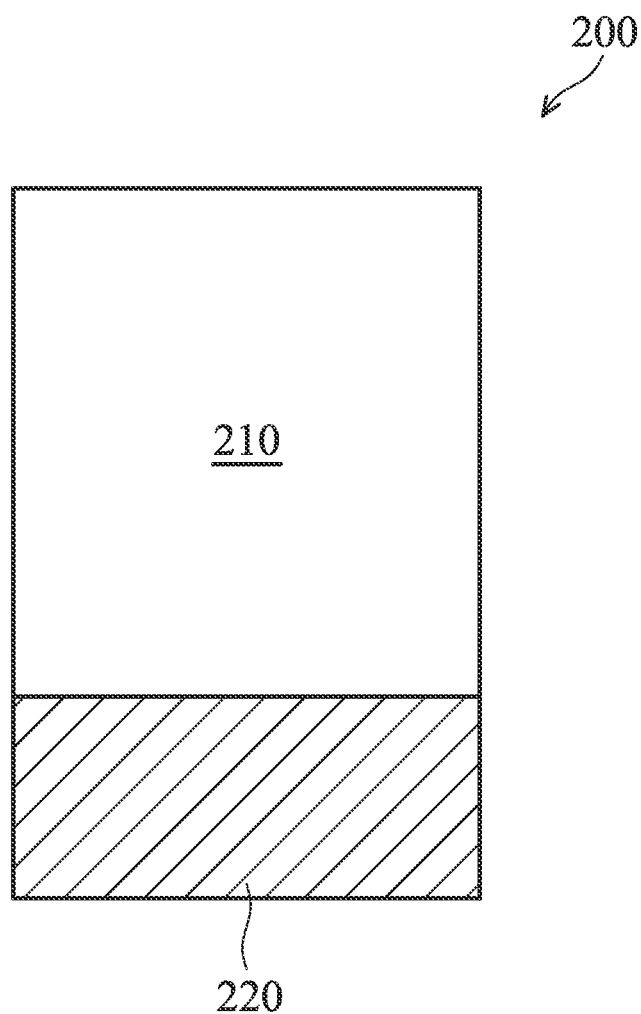
FIG. 2 is a schematic diagram of an exemplary embodiment of a storage medium.

FIG. 2 is a schematic diagram of an exemplary embodiment of a storage medium. It is assumed that the storage medium 200 is a specific storage medium. As shown in FIG. 2, the storage medium 200 comprises a usable area 210 and a masked area 220. When the storage medium 200 is coupled to the host 110, if the icon 114 is not selected, the storage medium 200 provides the usable area 210 to be used by the host 110. Thus, the host 110 can only access the data stored in the usable area 210.

However, when the icon 114 is selected, the storage medium 200 provides the usable area 210 and the masked area 220 to be used by the host 110. Thus, the host 110 can access the data stored in the usable area 210 and the masked area 220.

In one embodiment, when the storage medium 120 receives a read command sent from a specific host, which has a mass-production application program, the storage medium 120 provides the information in the masked area 220, such as a mass-production number, a mass-production serial number, a product identification code, and so on. In one embodiment, the information in the masked area 220 is encrypted. Thus, the host 110 needs to decrypt the encrypted information to access data stored in the masked area 220.

In this embodiment, the masked area 220 stores an identification code. The host 110 determines whether the storage medium 200 is a key according to the identification code stored in the masked area 220. When the identification code of the storage medium 200 matches a key code, it means that the storage medium 200 is a key. Thus, the host 110 executes a mass-production operation. In one embodiment, the mass-production operation is to write data to the electronic product 130. However, when the identification code of the storage medium 200 does not match the key code, the host 110 uses the storage medium 200 as a general storage device and does not execute the mass-production application program corresponding to the icon 114.

In other embodiments, the masked area 220 further stores a first counter value. The host 110 executes a mass-production application program according to the first counter value. In one embodiment, the first counter value represents the number of times data is written from the host 110 to the electronic product 130. Before executing the mass-production application program, the processor reads the first counter value of the storage medium 120 to determine whether the first counter value is less than a pre-determined value.

When the first counter value is less than the pre-determined value, it means that the number of times data is written from the host 110 to the electronic product 130 does not exceed a standard. Thus, the processor writes mass-production data to the electronic product 130. After the mass-production data is written to the electronic product 130, the processor increases the first counter value. When the first counter value is not less than the pre-determined value, it means that the number of times data is written from the host 110 to the electronic product 130 exceeds a standard. Thus, the processor stops executing the mass-production application program and stops writing the mass-production data to the electronic product 130. Since the number of times the mass-production data is written is controlled, the reliability of the access system 100 is increased.

In another embodiment, the masked area 220 further stores a second counter value. The second counter value represents the number of times the mass-production data is written successfully to the electronic product 130 or the number of times the mass-production data is written unsuccessfully to the electronic product 130. When the mass-production data is successfully or unsuccessfully written to the electronic product 130, the host 110 changes the second counter value. Thus, a designer can determine whether each write operation is successful according to the stored value in the masked area 220 of the storage medium 120 such that there will be a great benefit for reviewing and compiling the products.

In other embodiments, when the storage medium 200 is inserted into a general host, which does not comprise a mass-production application program, the storage medium 200 only provides the usable area 210 to be used by the host. Thus, the general host 110 can only access the data stored in the usable area 210 and cannot access the data stored in the masked area 220.

Figure 3A:
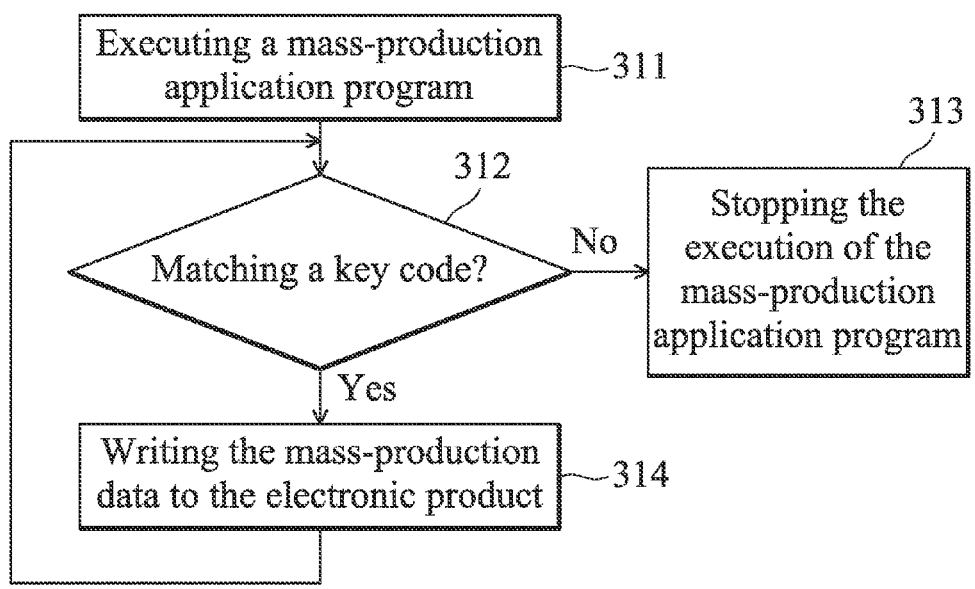
FIG. 3A is a schematic diagram of an exemplary embodiment of an access method.

FIG. 3A is a schematic diagram of an exemplary embodiment of an access method. The access method of the invention is applied to a host comprising at least two connection ports. One connection port serves as an identification port. The identification port is configured to couple to a storage medium. Another connection port is configured to couple to at least one electronic product.

First, a mass-production application program is executed (step 311). In one embodiment, the mass-production application program is executed via various hardware structures, such as different processors, controllers, and so on.

Next, the identification code of a storage medium is verified to determine whether it matches a key code (step 312). In one embodiment, when the storage medium is coupled to the identification port of the host, the host retrieves the identification code of the storage medium and compares the identification code with a key code. In another embodiment, the storage medium comprises a masked area. Only a specific host is capable of accessing data stored in the masked area.

When the identification code does not match the key code, it means that a write operation to be executed by the host is not authorized. Thus, the mass-production application program is not executed and the mass-production data is not written to the electronic product (step 313). When the identification code matches the key code, it means that the write operation to be executed by the host is authorized. Thus, the mass-production data is written to the electronic product (step 314) and then step 312 is executed again to determine whether the identification code matches the key code.

Figure 3B:
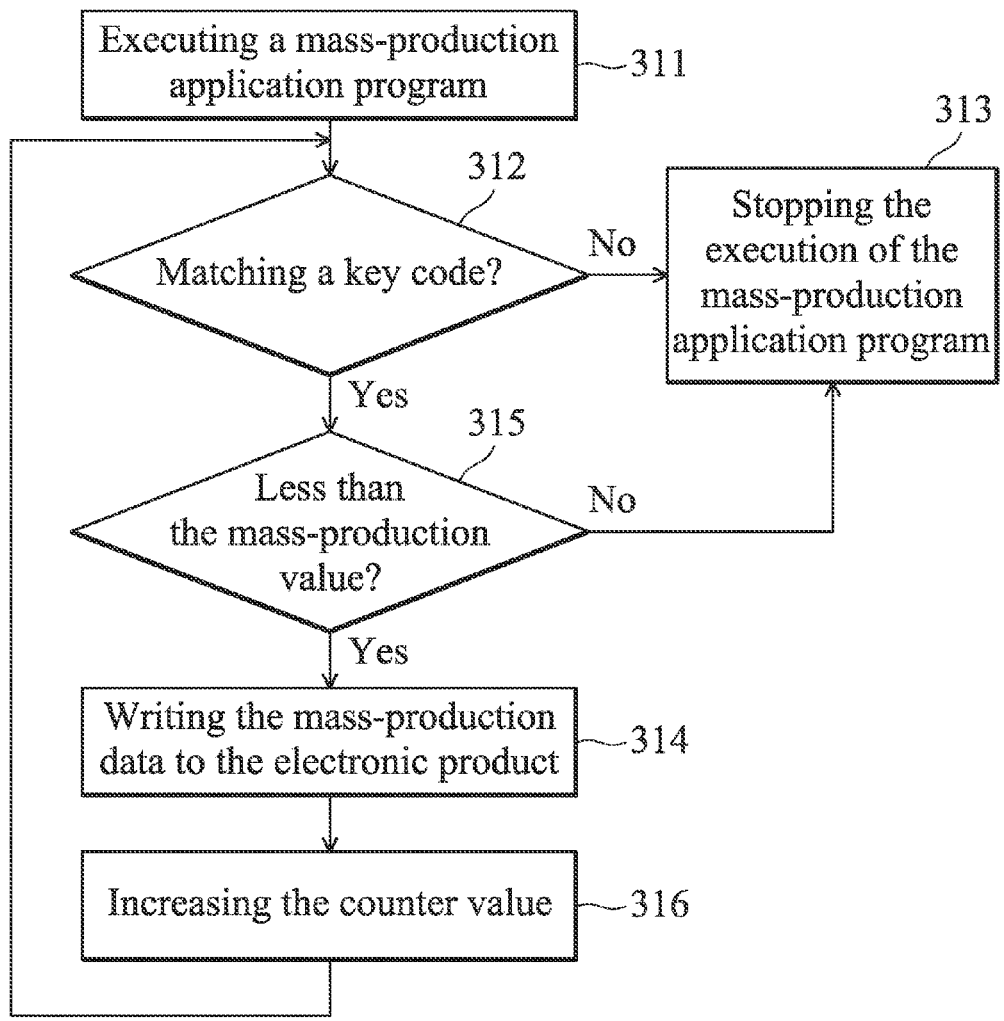
FIG. 3B is a schematic diagram of another exemplary embodiment of an access method.

FIG. 3B is a schematic diagram of another exemplary embodiment of an access method. First, a mass-production application program is executed (step 311). In another embodiment, the mass-production application program is executed by various hardware structures. Then, it is determined whether the identification code of a storage medium matches a key code (step 312).

When the identification code does not match the key code, the mass-production application program is not executed and the mass-production data is not written to the electronic product (step 313). When the identification code matches the key code, the counter value of the storage medium is retrieved and it is determined whether the counter value is less than the mass-production value (step 315).

In one embodiment, when the identification code matches the key code, a read command is sent to retrieve the counter value stored in the masked area of the storage medium. When receiving a specific command, the storage medium provides an identification code and a counter value, which are stored in the storage medium.

In this embodiment, when the counter value is less than the mass-production value, the mass-production data is written to the electronic product (step 314), the counter value is increased (step 316), and then step 312 is executed. In this embodiment, the number of times the mass-production data is written to the electronic product is obtained according to the counter value.

When the counter value of the storage medium is not less than the mass-production value, it means that the number of times the mass-production data has been written to the electronic product has reached a maximum value. Thus, the mass-production data is not written to the electronic product (step 313).

The storage medium is utilized to control the number of times the mass-production application program is executed. Only when the specific storage medium is coupled to the host, the host is capable of executing the mass-production application program to write mass-production data to an electronic product. When the host does not detect the specific storage medium, the host cannot execute the mass-production application program. Furthermore, since the host is capable of detecting the identification code of the storage medium, the user is not required to input a secret code. Thus, the reliability of the mass-production application program can be increased.

During execution of the mass-production application program, the host determines whether to continuously write the mass-production data to the electronic product according to the counter value of the specific storage medium. When the counter value of the specific storage medium is not less than the mass-production value, the host stops executing the mass-production application program. When the counter value is less than the mass-production value, the host writes the mass-production data to the electronic product and increases the counter value stored in the specific storage medium.

Additionally, the specific storage medium comprises a masked area to store an encrypted or an unencrypted mass-production number, mass-production serial number, product identification code, counter value, and so on. Only the specific host, which comprises a mass-production application program, can access the masked area. General hosts cannot access the data stored in the masked area. Thus, the reliability of the mass-production data can be increased.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An access system, comprising:
    a storage medium comprising an identification code; and
    a host comprising:
        a processor executing a mass-production application program;
        at least one connection port coupled to at least one electronic product; and
        an identification port coupled to the storage medium, wherein when the mass-production application program is executed, the processor determines whether the identification code matches a key code, and when the identification code matches the key code, the processor writes mass-production data to the electronic product, wherein the storage medium comprises a counter value, when the identification code matches the key code, the processor reads the counter value, and when the counter is less than a mass-production value, the processor writes the mass-production data to the electronic product and increases the counter value.

2. The access system as claimed in claim 1, wherein when the identification code does not match the key code, the processor stops executing the mass-production application program and stops writing the mass-production data to the electronic product.

3. The access system as claimed in claim 1, wherein when the identification port is not coupled to the storage medium, the processor stops executing the mass-production application program and stops writing the mass-production data to the electronic product.

4. The access system as claimed in claim 1, wherein when the counter value is not less than the mass-production value, the processor stops executing the mass-production application program and stops writing the mass-production data to the electronic product.

5. The access system as claimed in claim 1, wherein the storage medium comprises a masked area storing the counter value.

6. An access method for a host comprising at least one connection port and an identification port, wherein the connection port is configured to couple to at least one electronic product and the identification port is configured to couple to a storage medium, comprising:
    executing a mass-production application program;
    determining whether an identification code of the storage medium matches a key code;
    writing mass-production data to the electronic product when the identification code matches the key code;
    reading a counter value of the storage medium when the identification code matches the key code; and
    writing the mass-production data to the electronic product and increasing the counter value when the counter value is less than a mass-production value.

7. The access method as claimed in claim 6, further comprising:
    stopping the execution of the mass-production application program and stopping the writing of the mass-production data to the electronic product when the identification code does not match the key code.

8. The access method as claimed in claim 6, further comprising:
    stopping the execution of the mass-production application program and stopping the writing of the mass-production data to the electronic product when the counter value is not less than the mass-production value.

9. The access method as claimed in claim 6, further comprising:
    sending a read command to read the counter value, which is stored in a masked area of the storage medium.

\* \* \* \* \*